United States Patent
Jeong et al.

(10) Patent No.: US 11,845,666 B2
(45) Date of Patent: Dec. 19, 2023

(54) METHOD FOR PREPARING SYNTHESIS GAS

(71) Applicants: Hyundai Motor Company, Seoul (KR); Kia Corporation, Seoul (KR); Research & Business Foundation Sungkyunkwan University, Gyeonggi-do (KR)

(72) Inventors: Haeun Jeong, Gyeonggi-do (KR); Jin Woo Choung, Gyeonggi-do (KR); Jong Wook Bae, Gyeonggi-do (KR); Kyung Soo Park, Gyeonggi-do (KR); Ji Su Yu, Gyeonggi-do (KR); Jaehyeon Kwon, Gyeonggi-do (KR)

(73) Assignees: Hyundai Motor Company, Seoul (KR); Kia Corporation, Seoul (KR); Research & Business Foundation Sungkyunkwan University, Gyeonggi-do (KR)

(\*) Notice: Subject to any disclaimer, the term of this patent is extended or adjusted under 35 U.S.C. 154(b) by 238 days.

(21) Appl. No.: 17/224,776

(22) Filed: Apr. 7, 2021

(65) Prior Publication Data

US 2022/0089436 A1 Mar. 24, 2022

(30) Foreign Application Priority Data

Sep. 18, 2020 (KR) ........................ 10-2020-0120185

(51) Int. Cl.
*C01B 32/40* (2017.01)
*B01J 29/03* (2006.01)
(Continued)

(52) U.S. Cl.
CPC ............... *C01B 32/40* (2017.08); *B01J 21/08* (2013.01); *B01J 29/0325* (2013.01); *B01J 29/0333* (2013.01); *B01J 29/0341* (2013.01); *B01J 29/042* (2013.01); *B01J 29/045* (2013.01); *B01J 35/023* (2013.01); *B01J 35/1061* (2013.01); *B82Y 30/00* (2013.01); *C01B 2203/0233* (2013.01); *C01P 2004/64* (2013.01)

(58) Field of Classification Search
None
See application file for complete search history.

(56) References Cited

U.S. PATENT DOCUMENTS

2017/0001176 A1\* 1/2017 D'Souza ................ B01J 35/023

FOREIGN PATENT DOCUMENTS

KR 101481972 B1 1/2015

OTHER PUBLICATIONS

Meloni et al., "A Short Review on Ni Based Catalysts and Related Engineering Issues for Methane Steam Reforming", Catalysts 2020, 10, 352.

(Continued)

*Primary Examiner* — Colin W. Slifka
(74) *Attorney, Agent, or Firm* — Fox Rothschild LLP

(57) ABSTRACT

Disclosed is a method for preparing a synthesis gas. The method may include performing a combined reforming reaction by injecting a reaction gas including water ($H_2O$) and heat-treating it in the presence of the catalyst. The catalyst may include a mesoporous support including regularly distributed mesopores, metal nanoparticles supported on the support, and a metal oxide coating layer coated on a surface of the support.

14 Claims, 4 Drawing Sheets

(51) Int. Cl.
- *B01J 21/08* (2006.01)
- *B01J 29/04* (2006.01)
- *B01J 35/02* (2006.01)
- *B01J 35/10* (2006.01)
- *B82Y 30/00* (2011.01)

(56) References Cited

OTHER PUBLICATIONS

Takahashi et al., "Addition of zirconia in Ni/SiO2 catalyst for improvement of steam resistance", Applied Catalysis A: General 273 (2004) 211-215.

Han et al., "Core-Shell Structured Ni@SiO2 Catalysts Exhibiting Excellent Catalytic Performance for Syngas Methanation Reactions", Catalysts 2017, 7, 21.

Wang et al., "Synthesis, characterization and catalytic performance of MgO-coated Ni/SBA-15 catalysts for methane dry reforming to syngas and hydrogen", International Journal o f Hydrogen Energy 38 (2013) 9718-9731.

\* cited by examiner

Preparation Example 1
NP(10)/SBA-15@SiO$_2$

Preparation Example 2
NP(5)/SBA-15@SiO$_2$

Comparative
Preparation Example 1
NP(10)/SBA-15

Comparative
Preparation Example 2
NP(5)/SBA-15

Preparation Example 1
NP(10)/SBA-15@SiO$_2$

Preparation Example 2
NP(5)/SBA-15@SiO$_2$

Comparative
Preparation Example 1
NP(10)/SBA-15

Comparative
Preparation Example 2
NP(5)/SBA-15

METHOD FOR PREPARING SYNTHESIS GAS

CROSS-REFERENCE TO RELATED APPLICATION

This application claims priority to and the benefit of Korean Patent Application No. 10-2020-0120185 filed in the Korean Intellectual Property Office on Sep. 18, 2020, the entire contents of which are incorporated herein by reference.

TECHNICAL FIELD

The present invention relates to a method for preparing a synthesis gas.

BACKGROUND

The rise in global temperature caused by greenhouse gases such as carbon dioxide ($CO_2$) has led to sea level rise, natural disasters, and ecosystem changes. Humans have developed technologies such as carbon capture and storage (CCS) and carbon capture and utilization (CCU) to reduce carbon dioxide emissions, but the CCS and the CCU do not solve essential problems of existing carbon dioxide emissions.

The carbon dioxide emissions are generated when most of energy and materials necessary for humanity to live, such as electricity, transportation, industry, and housing, are produced. Regulations to reduce $CO_2$ emissions, such as carbon emission reduction targets under the Paris Climate Agreement, rising carbon credit prices, achievement of zero net carbon emissions that is the EU Green Deal policy, and European Renewable Energy Directive 2 (RED2) regulations on $CO_2$ inclusion in fuel manufacturing processes are being strengthened worldwide.

As one of methods to reduce $CO_2$, instead of energy that causes environmental pollution such as fossil fuels or nuclear power, hydrogen is spotlighted as a clean energy carrier of the future. Hydrogen may be used for fuel cells in plant power generation and transportation. Currently, steam reforming (see Reaction Equation 1 below) is being commercialized as a method for producing hydrogen. For example, when 1 kg of hydrogen is produced according to the steam reforming, about 8 kg or more of carbon dioxide is emitted, and as an alternative, when hydrogen is produced by using dry reforming (see Reaction Equation 2 below), an amount of carbon dioxide generated may be significantly reduced. However, the dry reforming causes serious deactivation due to carbon deposition in the catalyst and the compositional characteristics of the reaction gas, it is difficult to commercialize it. In addition, since the synthesis gas is generated at a ratio of $H_2/CO=1$, subsequent processes requiring $H_2/CO>1$ such as Fischer-Tropsch reaction and synthesis of oxygen-containing compounds and the like are not possible. To improve this, a combined reforming (see Reaction Equation 3 below) in which steam was added to dry reforming was proposed. The combined reforming can produce more hydrogen than dry reforming while consuming carbon dioxide, and can be applied to subsequent processes requiring $H_2/CO>1$. It may be used as a raw material for preparing dimethyl ether (DME), which may be used as an alternative fuel for diesel or gasoline in the transportation field. Using a low-carbon synthetic fuel instead of the current fuels can reduce $CO_2$ by several Gtons per year.

$CH_4+H_2O \rightarrow 3H_2+CO$ [Reaction Equation 1] Steam reforming of methane $CH_4+CO_2 \rightarrow 2H_2+2CO$ [Reaction Equation 2] Dry reforming of methane $3CH_4+CO_2+2H_2O \rightarrow 4CO+8H_2$ [Reaction Equation 3] Combined steam and carbon dioxide reforming of methane $CH_4 \rightarrow C(s)+2H_2$ [Reaction Equation 4] Methane decomposition $2CO \rightarrow C(s)+CO_2$ [Reaction Equation 5] Boudouard reaction $C(s)+H_2O \rightarrow H_2+CO$ [Reaction Equation 6] Coke steam gasification The reforming reaction goes through the steps of reaction equation 4 to reaction equation 6, and in particular, if the reverse reaction of reaction equation 5 and the coke steam gasification reaction of reaction equation 6 are not actively performed, carbon can be deposited and grown at the active point of the catalyst to structurally disintegrate and deactivate the catalyst.

Therefore, in order to simultaneously convert thermodynamically stable methane and carbon dioxide, there is a need for a catalyst that guarantees heat resistance and high conversion efficiency applicable at high temperatures (e.g., about 700° C. to 1200° C.) that can minimize carbon deposition.

On the other hand, since the commercially used alumina support for the $Ni/Al_2O_3$ catalyst for methane steam reforming has strong metal-support interaction and hydrothermal resistance, the alumina support is mainly used as a support for a reforming catalyst accompanying steam. However, the alumina support has a relatively strong acid point, so that the catalytically active metal aggregates during the reaction and is vulnerable to carbon deposition.

On the other hand, nickel-based silica catalysts have a weak acid point and are relatively free from carbon deposition, but when exposed to high-temperature steam, deterioration occurs due to continuous hydrothermal reaction, resulting in a decrease in specific surface area and consequently aggregation of nickel particles and deactivation of the catalyst through surface oxidation. Accordingly, although nickel-based silica catalysts can improve particle aggregation and carbon deposition by using a high specific surface area support, they have been studied only as a catalyst for dry reforming reaction with little steam.

The above information disclosed in this Background section is only for enhancement of understanding of the background of the invention, and therefore it may contain information that does not form the prior art that is already known in this country to a person of ordinary skill in the art.

SUMMARY

In preferred aspects, provide is a method for preparing a synthesis gas that may simultaneously convert main greenhouse gases carbon dioxide and methane to prepare a synthesis gas, may produce the synthesis gas without aggregation of active particles and deposition of carbon. For example, although the combined reforming in which a reaction gas includes carbon dioxide, methane, and steam, the synthesis gas may be applied to the subsequent Fischer Tropsch process.

In one aspect, a method for preparing a synthesis gas is provided, comprising injecting a reaction gas comprising water ($H_2O$) and heat-treating in the presence of a catalyst, wherein the catalyst comprises: a mesoporous support, metal nanoparticles supported on the support, and a metal oxide coating layer coated on a surface of the support. Suitably, a combined reforming reaction is performed and comprises the injecting of the reaction gas. Suitably, the mesoporous support comprises regularly distributed mesopores, In an aspect, provided is a method for preparing a synthesis gas. The method may include performing a combined reforming reaction by injecting a reaction gas including water ($H_2O$) and heat-treating it in the presence of the catalyst. The catalyst may include a mesoporous support including regularly distributed mesopores, metal nanoparticles supported on the support, and a metal oxide coating layer coated on a surface of the support.

The "mesoporous support" as used herein refers to a porous material that includes pores or holes having a size range of about 1 nm to 100 nm, or 2 and 50 nm. Exemplary mesoporous substrate may include closed or open pores within a predetermined size (e.g., about 2 to 50 nm), which is measured by maximum diameter of the pores.

The reaction gas may include one or more selected from the group consisting of the water, and a C1 to C20 alkane, a C1 to C20 alkene, a C1 to C20 alkyne, carbon dioxide, ammonia, $HCO_2H$, and $CH_3OH$.

The reaction gas may suitably include methane and an oxidizing agent including carbon dioxide and the water, and the synthesis gas may suitably include hydrogen and carbon monoxide.

The reaction gas may include the methane and the oxidizing agent in a molar ratio of about 1:1 to 1:1.9.

The oxidizing agent may include the carbon dioxide and the water in a molar ratio of about 1:0.2 to 0.4:0.8.

The combined reforming reaction may be performed at a temperature of about 650° C. to 850° C.

The support may include one or more selected from the group consisting of poly(ethylene oxide)-poly(propylene oxide)-poly(ethylene oxide) (pluronic P123), polyethylene oxide (PEO), polypropylene oxide (PPO), $SiO_2$, $Al_2O_3$, MgO, $MgAl_2O_4$, $La_2O_3$, $CeO_2$, $ZrO_2$, SiC, an indium tin oxide (ITO), and a fluorine doped tin oxide (FTO).

The support may include one or more selected from the group consisting of MCM-41, MCM-48, SBA-1, SBA-15, SBA-16, KIT-1, KIT-6, MSU-1, HMS, AMS-8, AMS-10, FDU-1, FDU-2, and FDU-12.

The metal nanoparticle may include one or more selected from the group consisting of Ni, Fe, Cu, Co, Mo, Ru, Rh, Pd, Ag, Cd, Zn, Au, Pt, Ir, Os, W, and an oxide thereof.

A diameter of the metal nanoparticle may be about 10 nm or less.

The metal nanoparticle may be included at about 5 parts by weight to about 15 parts by weight with respect to 100 parts by weight of the support.

The metal oxide coating layer may include one or more selected from the group consisting of $SiO_2$, $Al_2O_3$, MgO, $MgAl_2O_4$, $La_2O_3$, $CeO_2$, $ZrO_2$, SiC, an indium tin oxide (ITO), and a fluorine doped tin oxide (FTO).

The metal oxide coating layer may include mesopores having a diameter of about 2 nm to 50 nm.

The metal oxide coating layer may be included at about 5 parts by weight to 15 parts by weight based on 100 parts by weight of the support.

The method for preparing the synthesis gas of the present invention may simultaneously convert main greenhouse gases carbon dioxide and methane to prepare a synthesis gas, may produce the synthesis gas without aggregation of active particles and deposition of carbon, even in the case of combined reforming in which a reaction gas includes carbon dioxide, methane, and steam, and the synthesis gas may be applied to the subsequent Fischer Tropsch process.

Other aspect of the invention are disclosed infra.

DETAILED DESCRIPTION

Figure 1:
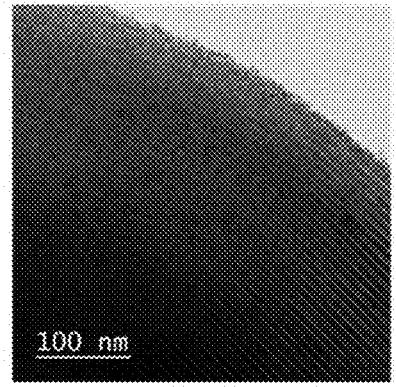
FIG. 1 shows a transmission electron microscope (TEM) photograph of an exemplary catalyst before a synthesis gas preparation reaction measured in Experimental Example 2.
Figure 1:
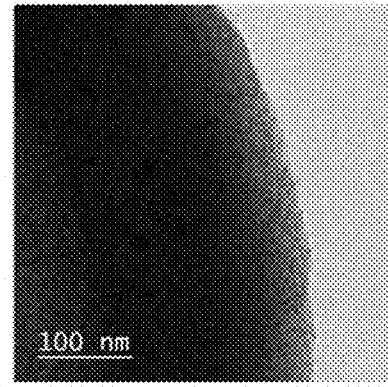
Figure 1:
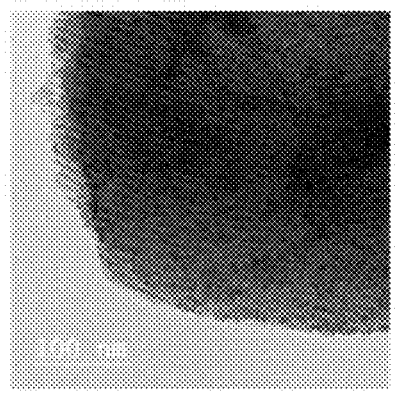
Figure 1:
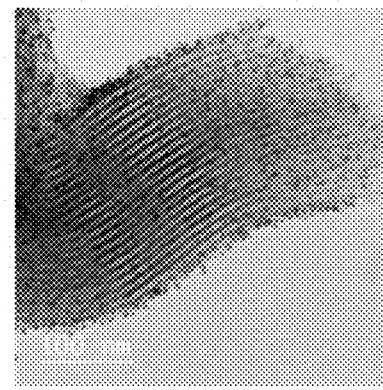

Advantages and features of the present disclosure and methods of accomplishing the same may be understood more readily by reference to the following detailed description of preferred embodiments and the accompanying drawings. However, this disclosure may be embodied in many different forms and is not to be construed as limited to the embodiments set forth herein. Unless otherwise defined, all terms (including technical and scientific terms) used herein have the same meaning as commonly understood by one of ordinary skill in the art. Further, it will be understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

In the present specification, unless explicitly described to the contrary, the word "comprise" and variations such as "comprises" or "comprising" will be understood to imply the inclusion of stated elements but not the exclusion of any other elements.

Further, as used herein, the singular forms "a", "an", and "the" are intended to include the plural forms as well, unless the context clearly indicates otherwise.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In an aspect, the method of preparing the synthesis gas may be achieved by performing a combined reforming reaction by injecting a reaction gas including water ($H_2O$) and heat-treating it in the presence of the catalyst. The catalyst includes an ordered mesoporous support including regularly distributed mesopores, metal nanoparticles supported on the support, and a metal oxide coating layer coated on a surface of the support.

The reaction gas may include one or more selected from the group consisting of the water, and a C1 to C20 alkane, a C1 to C20 alkene, a C1 to C20 alkyne, carbon dioxide, ammonia, $HCO_2H$, and $CH_3OH$. For example, the reaction gas may include methane and an oxidizing agent including carbon dioxide and the water, and in this case, the synthesis gas may include hydrogen and carbon monoxide. For example, the water may be included in the reaction gas in the form of steam.

A molar ratio of the reaction gas may be adjusted for obtaining a synthesis gas of a required composition. The reaction gas may include the methane and the oxidizing agent (the carbon dioxide and the water) in a molar ratio of about 1:1 to 1:1.9, for example, in a molar ratio of about 1:1.2 to 1:1.4.

Meanwhile, in the case of the combined reforming, the reaction gas may further include nitrogen together with the methane, the carbon dioxide and the water. The nitrogen may be included in a molar ratio of about 1:1 to 1:3 with respect to the methane.

When the molar ratio of the oxidizing agent is less than about 1, the conversion rate of the methane may be decreased and the amount of carbon precipitation may be increased, and when it is greater than about 1.9, the conversion rate of the carbon dioxide may be decreased, and the amount of hydrogen prepared by oxidizing the surface of the metal nanoparticles, which are the active materials of the catalyst, may be decreased. When the molar ratio of the methane and the oxidizing agent is 1:1 to 1:1.9, the ratio may be optimal, considering the conversion rate of the reaction gas, the ratio of Hz/CO in the prepared gas, and the amount of carbon precipitation.

The oxidizing agent may include the carbon dioxide and the water in a molar ratio of about 1:0.2 to 0.4:0.8. When the molar ratio of the water is greater than about 0.8, deactivation of the catalyst may be promoted due to unreacted residual steam.

The reaction gas may be supplied at a flow rate of about 40,000 L/kgcat·h to 80,000 L/kgcat·h (based on 50 mg of catalyst). The supply rate of the reaction gas may be increased in proportion to a size of a combined reforming reactor and an amount at which the catalyst is received.

A reaction temperature and pressure of the combined reforming may be appropriately adjusted according to a composition of a required synthesis gas. For example, the combined reforming reaction may be performed at a temperature of about 650° C. to 850° C., or about 750° C. to 850° C. When the reaction temperature is less than about 650° C., the conversion rate of carbon dioxide may be significantly lowered, and when it is greater than about 850° C., thermal energy may be consumed inefficiently.

For example, the combined reforming reaction may be performed at a pressure of about 0.5 atm to 20 atm. When the reaction pressure is greater than about 20 atm, the conversion rate of the reaction gases decreases, so that the $H_2$/CO ratio may vary.

The conversion rate of methane and/or carbon dioxide with respect to the reaction gas may be about 45 mol % to 95 mol %, and may be stable in carbon precipitation at about 800° C. up to 100 hours.

The catalyst for preparing the synthesis gas may include an ordered mesoporous support including regularly distributed mesopores, metal nanoparticles supported on the support, and a metal oxide coating layer coated on a surface of the support.

The support may include an ordered mesoporous structure including regularly distributed mesopores. A mesopore diameter of the mesoporous structure may be about 1 nm to 30 nm, for example, about 2 nm to 20 nm, or 5 nm to 10 nm. The ordered mesoporous structure highly disperses the metal nanoparticles, which are active materials, thus may provide a stable structure to the catalyst. When a mesopore size of the ordered mesoporous structure is greater than the predetermined size, e.g., greater than about 30 nm, structural stability of the catalyst may be deteriorated, and when the mesopore size is less than the predetermined size, e.g., less than about 1 nm, the metal nanoparticles as the active material may not be well supported in the mesopores of the ordered mesoporous structure.

As the ordered mesoporous structure has the mesopores, it may have a high specific surface area, and thus may support a large amount of active metal nanoparticles, and reaction gas supply to the supported metal nanoparticles and diffusion of products and by-products from the metal nanoparticles may be easily achieved.

Accordingly, a specific surface area of the ordered mesoporous structure may is greater than about 200 $m^2$/g, for example, may be about 200 $m^2$/g to 800 $m^2$/g. When the specific surface area of the ordered mesoporous structure is about 200 $m^2$/g or less, an amount of metal nanoparticles that may be supported on the ordered mesoporous structure may be limited.

A pore volume of the ordered mesoporous structure may is greater than about 0.5 $cm^3$/g, for example, may be about 0.5 $cm^3$/g to 2.0 $cm^3$/g. When the pore volume of the ordered mesoporous structure is about 0.5 $cm^3$/g or less, it is difficult to support the metal nanoparticles in the inside of the mesopores, and thus dispersibility thereof may be low.

The ordered mesoporous structure may include one or more selected from the group consisting of poly(ethylene oxide)-poly(propylene oxide)-poly(ethylene oxide)(pluronic P123), polyethylene oxide (PEO), polypropylene oxide (PPO), $SiO_2$, $Al_2O_3$, MgO, $MgAl_2O_4$, $La_2O_3$, $CeO_2$, $ZrO_2$, SiC, an indium tin oxide (ITO), and a fluorine doped tin oxide (FTO).

The ordered mesoporous structure includes frameworks that form a wall between the mesopores. The frameworks may be shapeless, may form a complex network, and may be connected to each other.

The ordered mesoporous structure may be in a form including various types of mesoporous molecular complex network sieve materials having structures in which one-dimensional mesopores are interconnected by micropores, and for example, it may include one or more selected from the group consisting of MCM-41, MCM-48, SBA-1, SBA- 15, SBA-16, KIT-1, KIT-6, MSU-1, HMS, AMS-8, AMS-10, FDU-1, FDU-2, and FDU-12. The above-mentioned materials are molecular sieve materials having a three-dimensional connection structure, wherein MCM-48 has a cubic structure, SBA-1 has a different cubic structure, SBA-15 has a hexagonal-cubic structure, and KIT-1 or MSU-1 has a structure in which pores thereof are irregularly connected in three dimensions.

The metal nanoparticle as the active material may be supported on the pore and/or surface of the support.

The metal nanoparticle may include one or more selected from the group consisting of Ni, Fe, Cu, Co, Mo, Ru, Rh, Pd, Ag, Cd, Zn, Au, Pt, Ir, Os, W, and an oxide thereof. An appropriate combination of these may improve the precipitation of carbon, but may be less economical when using a noble metal series.

A diameter of the metal nanoparticle may be about 10 nm or less, for example, about 6 nm or less, or about 3 nm to 10 nm. When the diameter of the metal nanoparticle is less than the predetermined size, e.g., less than about 3 nm, the probability that the metal nanoparticle may be located inside the mesopores of the support may be greater, and the growth of a particle during the reaction may be prevented. When it is greater than about 10 nm, the possibility of growth after carbon precipitation may increase.

The metal nanoparticle may be included at about 5 parts by weight to 15 parts by weight with respect to 100 parts by weight of the support. When a content of the metal nanoparticles is less than about 5 parts by weight, a conversion rate of carbon dioxide and methane may be low, and when it is greater than about 15 parts by weight, a lifespan of the catalyst may be reduced due to a coke formation reaction and a particle aggregation phenomenon. That is, when the catalyst is applied to the combined reforming reaction including steam, the content of the metal nanoparticles must be sufficient to maintain reaction activity and durability.

The metal oxide coating layer may be located on the surface of the support. By the metal oxide coating layer, the metal nanoparticles may be prevented from agglomerating during particle growth and a synthesis gas preparation reaction by a space trapping effect between the support and the metal oxide coating layer.

The metal oxide coating layer may include one or more selected from the group consisting of $SiO_2$, $Al_2O_3$, MgO, $MgAl_2O_4$, $La_2O_3$, $CeO_2$, $ZrO_2$, SiC, an indium tin oxide (ITO), and a fluorine doped tin oxide (FTO).

The metal oxide coating layer may be included at about 5 parts by weight to 15 parts by weight, for example, about 9 parts by weight to 11 parts by weight, based on 100 parts by weight of the support. When a content of the metal oxide coating layer is less than about 5 parts by weight, it is difficult to obtain an effect of the coating and thus aggregation of the metal nanoparticles may increase, and when it is greater than about 15 parts by weight, the content of the metal nanoparticles decreases and thus aggregation may increase.

In the synthesis gas preparation catalyst, the metal nanoparticles, which are the active materials, may suitably be structurally well supported on the ordered mesoporous support, and aggregation between particles may be reduced by the metal oxide coating layer, thereby making it durable in carbon precipitation.

A method for preparing the catalyst may include preparing an ordered mesoporous support including regularly distributed mesopores, supporting metal nanoparticles on the support, and forming a metal oxide coating layer on a surface of the support.

The ordered mesoporous support may be prepared by using various known methods. For example, SBA-15 may be synthesized by dissolving pluronic P123 in an aqueous solution to use it as an organic template material, performing hydrolysis and condensation reaction of tetraethyl orthosilicate (TEOS) by using an acid catalyst, and then performing hydrothermal synthesis.

The supporting of the metal nanoparticles may be performed by allowing a solution containing the metal nanoparticles to contact the support, bonding them through ultrasonic treatment, and then drying them.

The solution containing the metal nanoparticles may be prepared by adding the metal nanoparticles to a solvent, and the solvent may include distilled water, ethanol, methanol, ethylene glycol, propylene glycol, isopropyl alcohol, or a combination thereof.

The drying may be performed at a temperature of about 60° C. to 90° C. When the drying temperature is less than about 60° C., not all of the solvent is removed, so the metal nanoparticles may flow out of the mesopores during a firing process, and when the drying temperature is greater than about 60° C., as the drying speed is fast, the metal nanoparticles may flow out of the mesopores during the drying as described above.

Meanwhile, an oxide of the metal nanoparticle may be generated when the catalyst is prepared. For example, in the process of preparing the catalyst for preparing the synthesis gas by bonding the metal nanoparticles to the support, drying them, and forming the metal oxide coating layer and then firing it, the metal nanoparticles may be partially reduced and oxidized, thus an oxide of the metal nanoparticle may be partially included in addition to the metal nanoparticle on the surface of the support.

The forming of the metal oxide coating layer may be performed by mixing the metal nanoparticle-supporting support and the metal oxide precursor, and firing them.

For example, after dispersing the prepared metal nanoparticle-supporting support in a solvent and then adding a surfactant (for example, cetyltrimethylammonium bromide (CTAB)) thereto, ultrasonic treatment may be performed to bond the surfactant to a surface of the metal nanoparticle-supporting support. Subsequently, a metal oxide precursor (for example, TEOS) may be injected and stirred to cause a coating reaction, and then firing may be performed to prepare a catalyst.

As such, by using the surfactant in the forming of the metal oxide coating layer, the metal oxide coating layer may be provided with mesopores having a diameter of about 2 nm to 50 nm. When the diameter of the mesopores of the metal oxide coating layer is greater than about 50 nm, the structural stability of the catalyst may be deteriorated, and when the diameter of the mesopores thereof is less than the predetermined size, e.g., less than about 2 nm, the proximity of the metal nanoparticle and the reaction gas may be deteriorated.

The surfactant may include one or more of a nonionic, cationic, and anionic surfactants in addition to cetyltrimethylammonium bromide, but the type thereof is not particularly limited.

EXAMPLE

Hereinafter, specific embodiments of the present invention are described. However, the following described examples are only for illustrating the invention more specifically, and thus the scope of the invention should not be limited by these examples.

Preparation Example: Preparation of Catalyst

Preparation Example 1

1) Preparation of Nickel Nanoparticles

Nickel nanoparticles were prepared by using a weak reducing agent in a low temperature organic solvent in the following way.

5 mmol of nickel-acetylacetonate (Sigma-Aldrich, hereinafter referred to as Ni(acac)$_2$) was added to a solution of 30 mL of oleylamine (Sigma-Aldrich, 90%, hereinafter referred to as Oam) and 1.6 mL of oleic acid (Sigma-Aldrich, hereinafter referred to as Oac), nitrogen-bubbled, and then stirred. It was heated at a temperature of 110° C. to remove water vapor and oxygen for 1 hour. In this process, all of the nickel precursor was dissolved to form a uniform green solution. Then, the solution was cooled to a temperature of 90° C., 4 mL of OAm in which 580 mg of borane tert-butylamine (Sigma-Aldrich, reducing agent, BTB) was dissolved was added, and the temperature of the solution which turned black was maintained for 1 hour. After the reaction was over, the solution was cooled, and 60 mL of ethanol was added to the solution at a temperature of about 50° C. or less to destabilize the generated nanoparticles in the reaction solvent. Then, the nanoparticles were separated from the reactants by centrifugation and washed. In the first centrifugation, they were separated from the reactants, and in the next two centrifugations, they were washed with ethanol, and after the last centrifugation, the separated nanoparticles were dispersed and stored in 40 mL of normal hexane (n-Hexane).

2) Preparation of Ordered Mesoporous Support (SBA-15)

2 g of a pluronic P123 copolymer (Sigma-Aldrich, poly(ethylene oxide)-poly(propylene oxide)-poly(ethylene oxide), hereinafter referred to as P123) was added to 15 g of distilled water and 60 g of a 2 M hydrochloric acid solution, and dissolved for a sufficient period of time while strongly stirring at room temperature to allow P123 in the solution to self-assemble. When all of P123 was dissolved and becomes a transparent solution, 4.25 g of tetraethyl orthosilicate (Sigma-Aldrich, hereinafter referred to as TEOS), which was a silica precursor, was rapidly added and stirred for 24 hours while maintaining a temperature of 35° C. The mixture was subjected to hydrothermal reaction in an oven at 110° C. for 24 hours. The prepared product was filtered and washed with distilled water, dried sufficiently in a convection oven at a temperature of 80° C., and then calcined at a temperature of 550° C. for 6 hours at a heating rate of 1° C./min under an air atmosphere (specific surface area 650 m$^2$/g to 720 m$^2$/g).

3) Supporting Nickel Nanoparticle on Ordered Mesoporous Support

A concentration of the prepared nickel nanoparticles was checked through induction ion plasma spectroscopy (ICP-OES) to be adjusted for supporting a desired amount of nickel. To disperse the nickel nanoparticles on the support, the nickel nanoparticles were made to be 10 parts by weight based on 100 parts by weight of the support, and 3 g of the support was added to the dispersion solution of the nickel nanoparticles and subjected to ultrasonication for 1 hour. After stirring it for 1 hour by using a rotary evaporator, hexane was evaporated under a room temperature and vacuum condition, and dried in a convection oven at 80° C. overnight to remove residual organic solvent.

4) Formation of Metal Oxide Coating Layer

A following method was used to coat a mesoporous silica material on the catalyst NP(10)/SBA-15 prepared above.

0.35 g of the prepared NP(10)/SBA-15 catalyst was ultrasonic-treated and dispersed in 9 mL of ethanol. A solution of 8 mL of ethanol and 0.6 mL of ammonia water (NH$_4$OH, Deoksan, 25% to 30%) in which 0.3 g of cetyltrimethylammonium bromide (Alfa-Aesar, 98%, hereinafter referred to as CTAB) was dissolved was added, and then ultrasonic-treated for an additional 10 minutes to attach CTAB to the surface of the prepared catalyst. While the mixture was strongly stirred at room temperature, 1.5 mL of TEOS (Daejung Chemical, 98.5%) was injected at a rate of 48 mL/h by using a syringe pump and stirred for 5 hours to continue the coating reaction. It was filtered and washed with ethanol, then dried overnight in a convection oven at a temperature of 80° C., and calcined for 2 hours at a temperature of 550° C. in an air atmosphere to prepare a catalyst, which is called NP(10)/SBA-15@SiO$_2$.

Preparation Example 2

The same process as in Preparation Example 1 was performed, but the concentration of the nickel nanoparticle dispersion solution was adjusted such that the Ni content of the nickel nanoparticles dispersed in hexane was about 5 parts by weight. The other catalyst preparation process was the same as in Preparation Example 1. The prepared catalyst is called NP(5)/SBA-15@SiO$_2$.

Comparative Preparation Example 1

The same process as in Preparation Example 1 was performed, but the metal oxide coating layer was not formed to prepare a catalyst. The prepared catalyst is called NP(10)/SBA-15.

Comparative Preparation Example 2

The same procedure as in Comparative Preparation Example 1 was performed, but the concentration of the nickel nanoparticle dispersion solution was adjusted such that the Ni content of the nickel nanoparticles dispersed in hexane was about 5 parts by weight. The prepared catalyst is called NP(5)/SBA-15.

Comparative Preparation Example 3

The Ni/SiO$_2$ catalyst without the ordered mesoporous structure was prepared through a general wet support method.

A nickel nitrate (Ni(NO$_3$)$_2$.6H$_2$O) as a nickel precursor was used to prepare a 100 mL aqueous solution so that nickel was 10 parts by weight based on 100 parts by weight of the support, and then 2 g of SiO$_2$ (Sigma-Aldrich, fumed silica, specific surface area 395 m$^2$/g) was dispersed in the solution through ultrasonic treatment and then stirred for 1 hour or more. Thereafter, the solvent was removed with a vacuum dryer, and calcined in air at a heating rate of 1° C./min for 30 minutes at a temperature of 450° C. and 2 hours at a temperature of 800° C. The prepared catalyst is called Ni(10)/SiO$_2$.

Experimental Example 1: Analysis of Surface Structure of Catalyst

To analyze the mesoporous structure and the surface structure of the coating catalyst thereof, a specific surface area and average pore size were analyzed by using Tri Star 3020. After the pre-treatment process to remove moisture and a surface adsorbing material, nitrogen was adsorbed and desorbed at a temperature of −196° C., and an amount thereof was measured to determine a specific surface area of the catalyst and a physical value of pores. Table 1 shows measurement results of physical properties thereof.

TABLE 1

| Classification | Preparation Example 1 | Preparation Example 2 | Comparative Preparation Example 1 | Comparative Preparation Example 2 | Comparative Preparation Example 3 |
|---|---|---|---|---|---|
| Ni content (parts by weight) | 10 | 5 | 10 | 5 | 10 |
| Specific surface area ($m^2/g$) | 647 | 719 | 617 | 669 | 203 |
| Average pore size (nm) | 3.1 | 3.0 | 6.1 | 6.1 | 18.0 |

Example 1: Synthetic Gas Preparation Through Low Steam Combined Reforming

The combined reforming experiment using carbon dioxide, methane, and steam was performed in a ⅜ in. Inconel fixed layer reactor. 0.05 g of catalyst was filled therein to heat 5 vol % of $H_2/N_2$ gas before reaction at a temperature of 800° C. for 1 hour at a rate of 30 mL/min. The catalysts prepared in Comparative Preparation Examples 1 to 3 were reduced for 10 minutes, and the catalysts prepared in Preparation Examples 1 and 2 were reduced for 1 hour. Then, a reaction gas of a ratio of $CH_4:CO_2:H_2O:N_2$ (internal standard material)=1:1:0.2:2 was injected at space velocity SV=60,000 L/$Kg_{cat}$·h at a normal pressure and reacted at a temperature of 800° C., 1 atm. The reaction was continuously performed for about 20 hours, and measurement results of $CO_2$ and $CH_4$ conversion rates and $H_2/CO$ molar ratios are shown in Table 2 below.

support catalyst (Comparative Preparation Example 3). It can be confirmed that the catalyst prepared in Comparative Preparation Example 3 lost activity after 6 hours of reaction and was deactivated, but when supported on the ordered mesoporous structure SBA-15 (Comparative Example 1 and Comparative Example 2), the nickel particles were stably fixed to improve the reaction gas conversion rate and durability of the catalyst, but the catalyst was deactivated after 20 hours of reaction. In addition, it can be confirmed that the catalysts prepared in Preparation Example 1 and Preparation Example 2, in which the mesoporous silica coating layers were additionally formed in Comparative Preparation Example 1 and Comparative Preparation Example 2, further improved the conversion rate and deactivation of the catalysts.

Experimental Example 2: Catalyst State Before and After Synthesis Gas Preparation (TEM)

The catalyst state before and after the synthesis gas preparation reaction of Example 3 was observed through a transmission electron microscope (TEM). The catalyst state before the synthesis gas preparation reaction is shown in FIG. 1, and the catalyst state after the synthesis gas preparation reaction is shown in FIG. 2.

Figure 2:
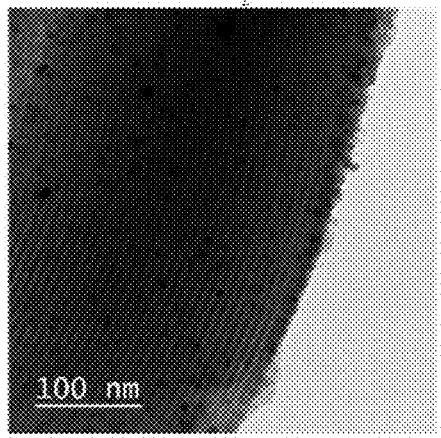
FIG. 2 shows a transmission electron microscope (TEM) photograph of an exemplary catalyst after a synthesis gas preparation reaction measured in Experimental Example 2.
Figure 2:
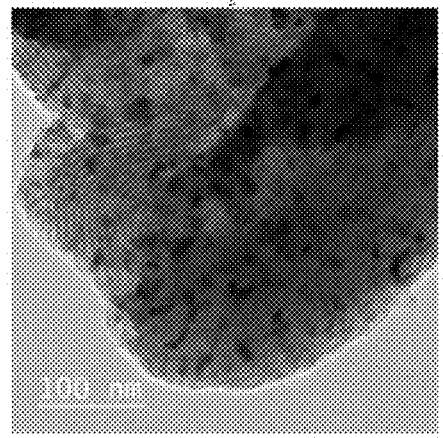
Figure 2:
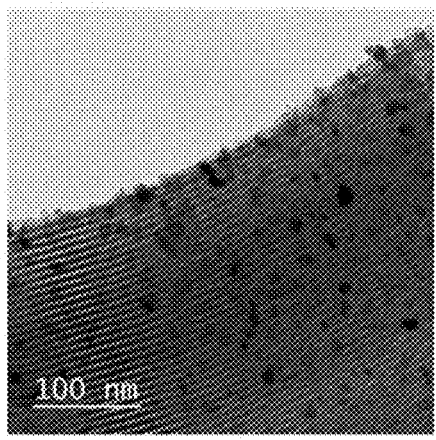
Figure 2:
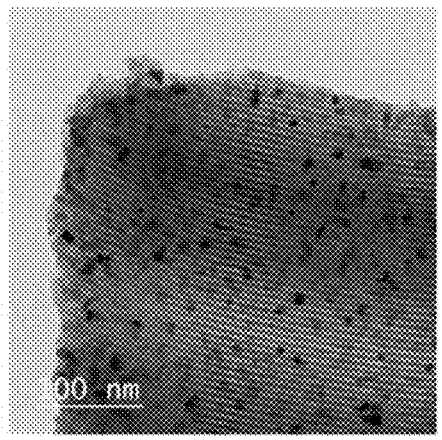

As shown in FIG. 1 and FIG. 2, it can be seen that the amount of nickel capable of reacting the reaction gas was sufficient, and the aggregation of active particles was

TABLE 2

| | Preparation Example 1 | | Preparation Example 2 | | Comparative Preparation Example 1 | | Comparative Preparation Example 2 | | Comparative Preparation Example 3 | |
|---|---|---|---|---|---|---|---|---|---|---|
| Classification | Beginning | 20 hours later | Beginning | 20 hours later | Beginning | 20 hours later | Beginning | 20 hours later | Beginning | 20 hours later |
| $CH_4$ conversion rate (%) | 94.1 | 93.8 | 82.2 | 78.4 | 74.9 | 64.0 | 33.4 | 14.5 | 19.8 | 19.0 |
| $CO_2$ conversion rate (%) | 71.4 | 75.8 | 64.5 | 62.4 | 63.6 | 52.2 | 30.4 | 14.4 | 23.2 | 23.0 |
| $H_2/CO$ ratio | 1.09 | | 1.09 | | 1.06 | | 0.85 | | 0.84 | |

As shown in Table 2, it can be confirmed that combined reforming activity was improved in the catalysts (Preparation Example 1, Preparation Example 2, Comparative Preparation Example 1, and Comparative Preparation Example 2) made of Ni nanoparticles compared to the typical $SiO_2$ improved in Preparation Example 1 in which the catalyst was coated. However, in the case of Preparation Example 2, since the content of nickel was relatively small, it can be seen that the unreacted steam weakened the durability of the silica coating.

Example 2: Synthetic Gas Preparation Through High Steam Combined Reforming

It was carried out in the same manner as in Example 1, except that the ratio of the reaction gas was adjusted to $CH_4:CO_2:H_2O:N_2$ (internal standard material)=1:1:0.8:2. The $CO_2$, $CH_4$ conversion and $H_2/CO$ molar ratio measurement results are shown in Table 3 below.

TABLE 3

| Classification | Preparation Example 1 | | Preparation Example 2 | | Comparative Preparation Example 1 | | Comparative Preparation Example 2 | | Comparative Preparation Example 3 | |
|---|---|---|---|---|---|---|---|---|---|---|
| | Beginning | 20 hours later | Beginning | 20 hours later | Beginning | 20 hours later | Beginning | 20 hours later | Beginning | 20 hours later |
| $CH_4$ conversion rate (%) | 86.5 | 92.1 | 54.7 | 4.0 | 22.7 | 14.9 | 16.7 | 1.8 | 8.3 | 4.7 |
| $CO_2$ conversion rate (%) | 43.0 | 46.0 | 26.8 | 2.6 | 11.5 | 5.5 | 9.7 | 0.5 | 5.2 | 2.1 |
| $H_2/CO$ ratio | 1.48 | | 1.53 | | 1.56 | | 1.65 | | 1.41 | |

As shown in Table 3, it can be seen that the initial activity was improved in a catalyst made of Ni nanoparticles (Preparation Example 1, Preparation Example 2, Comparative Preparation Example 1, and Comparative Preparation Example 2) than a catalyst supported on a general $SiO_2$ (Comparative Preparation Example 3). The catalyst prepared in Comparative Preparation Example 3 showed low activity from the beginning of the reaction. When Ni nanoparticles were supported on SBA-15 (Comparative Preparation Example 1 and Comparative Preparation Example 2), it can be seen that the reaction gas conversion rate was improved because the nickel particles were stably fixed, but the catalyst was severely deactivated due to the high steam content during the reaction.

In the case of the catalysts of Preparation Example 1 and Preparation Example 2 prepared by coating mesoporous silica in addition to Comparative Preparation Example 1 and Comparative Preparation Example 2, it can be seen that the initial conversion rate was further improved. However, in the case of the catalyst prepared in Preparation Example 2 having a low nickel content, it can be seen that the unreacted residual steam affected the catalyst and caused deactivation during the reaction. On the other hand, in the case of the catalyst prepared in Preparation Example 1, it can be confirmed that the gas conversion rate and durability of the catalyst during the reaction for 20 hours were excellent.

Experimental Example 3: Analysis of Carbon Precipitation Amount During Synthesis Gas Preparation (TGA)

After the synthesis gas preparation reaction of Examples 1 and 2, a thermogravimetric analyzer (TGA) was used to analyze the carbon precipitation amount of the catalyst. A weight change of the catalyst was measured after the reaction according to the combustion of the precipitated carbon, and Table 4 shows the carbon precipitation amount calculated by defining a weight loss in the range of 200° C. to 315° C. as a soft coke that was well regenerated by being hydrogenated to $CH_4$; and the carbon precipitation amount calculated by defining a weight loss between 500° C. and 800° C. as a hard coke that was difficult to be regenerated from the catalyst.

TABLE 4

| Carbon precipitation amount (wt %) | Preparation Example 1 | | Preparation Example 2 | | Comparative Preparation Example 1 | | Comparative Preparation Example 2 | | Comparative Preparation Example 3 | |
|---|---|---|---|---|---|---|---|---|---|---|
| | Soft coke | Hard coke | Soft coke | Hard coke | Soft coke | Hard coke | Soft coke | Hard coke | Soft coke | Hard coke |
| After Example 1 | 0.09 | 0.01 | 0.10 | 0.03 | 0.14 | 0.12 | 0.14 | 0.08 | 0.10 | — |
| After Example 2 | 0.06 | 0.06 | 0.08 | 0.02 | 0.03 | 0.03 | 0.04 | 0.04 | — | — |

As shown in Table 4, in the case of the catalyst prepared in Comparative Preparation Example 3, the degree of reaction was small, so that there was little carbon deposition, and other catalysts generally had very little carbon deposition (coke) amount. The cause of catalyst deactivation for 20 hours can be interpreted as being due to Ni aggregation and oxidation during reaction rather than carbon deposition.

Experimental Example 4: Analysis of NiO Average Crystal Size Before and After Reforming Reaction (XRD)

An X-ray diffraction (XRD) pattern analysis was performed to analyze the average crystal size of the catalytic active species before and after the synthesis gas preparation reaction of Example 2 with severe catalyst deactivation. The results are shown in FIG. 3 and FIG. 4, respectively, and the calculated average crystal sizes are shown in Table 5.

TABLE 5

| Classification | NiO average crystal size (nm) | |
| --- | --- | --- |
|  | Fresh | Used |
| Preparation Example 1 | 5.2 | 11.2 |
| Preparation Example 2 | 2.7 | 8.4 |
| Comparative Preparation Example 1 | — | 13.6 |
| Comparative Preparation Example 2 | — | 8.3 |
| Comparative Preparation Example 3 | 14.2 | 17.0 |

Figure 3:
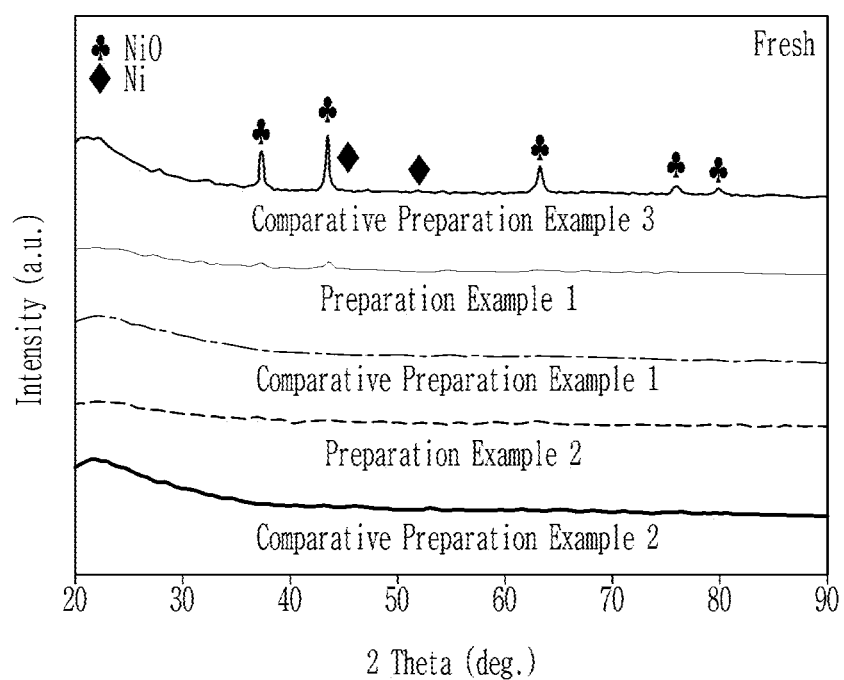
FIG. 3 shows a graph of a result of X-ray diffraction (XRD) pattern analysis of an exemplary catalyst before a synthesis gas preparation reaction measured in Experimental Example 4.
Figure 4:
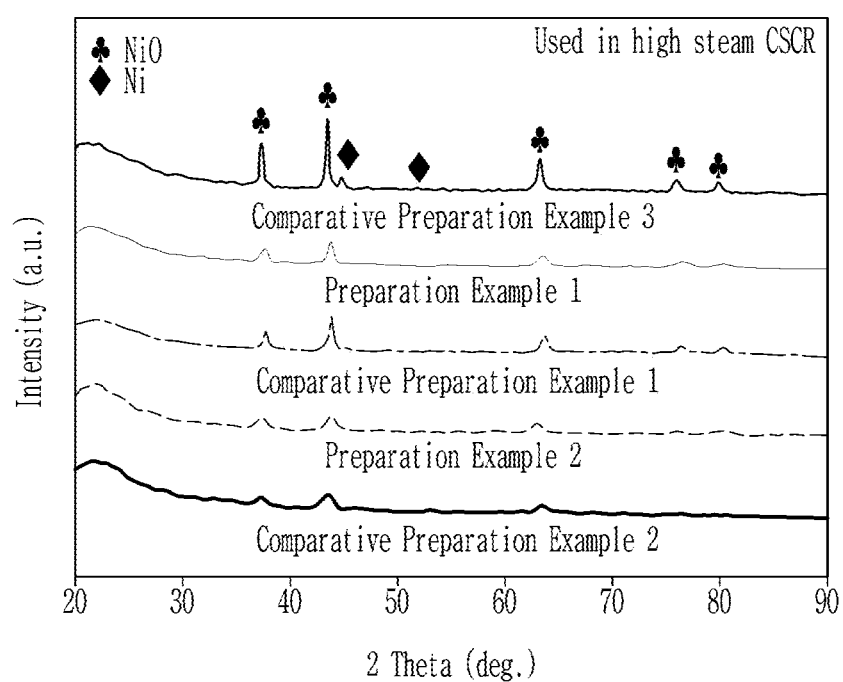
FIG. 4 shows a graph of a result of X-ray diffraction (XRD) pattern analysis of an exemplary catalyst after a synthesis gas preparation reaction measured in Experimental Example 4.

As shown in FIG. 3, FIG. 4, and Table 5, it can be confirmed that the NiO crystal size was maintained to be smaller in Comparative Example 1 and Comparative Example 2 using the nickel nanoparticles and the mesoporous support material than in Comparative Example 3. In the case of the catalyst prepared in Preparation Example 2 in which the catalyst of Comparative Preparation Example 2 was coated with $SiO_2$, unreacted steam had an effect on nickel aggregation and oxidation under high steam conditions. In the case of the catalyst prepared in Preparation Example 1 having a relatively larger nickel content, it can be seen that the NiO crystal size was smaller when $SiO_2$ is coated.

Through this, it can be interpreted that it was possible to prevent aggregation between particles and oxidation of the catalytic active species Ni through the use of a sufficient content of nickel capable of reacting steam, support on a mesoporous support material, and a surface-coated catalyst.

Experimental Example 5: Synthesis Gas Preparation Through Combined Reforming and Long-Term Stability Evaluation of Catalyst It was carried out in the same manner as in Example 1, except that ratio of the reaction gas for the catalyst prepared in Preparation Example 1 with the best activity was adjusted to $CH_4:CO_2:H_2O:N_2$ (internal standard material)=1:0.4:0.8:2. For long-term durability evaluation, the reaction was continuously performed for about 100 hours, and the measurement results of $CO_2$, $CH_4$ conversion and $H_2/CO$ molar ratio are shown in Table 6 below.

TABLE 6

| Classification | Preparation Example 1 | | Average deactivation rate (%/h) | Carbon precipitation amount | |
| --- | --- | --- | --- | --- | --- |
|  | Beginning | 100 hours later |  | Soft coke amount (wt %) | Hard coke amount (wt %) |
| $CH_4$ conversion rate (%) | 96.6 | 93.8 | −0.03 | 0.02 | 0.12 |
| $CO_2$ conversion rate (%) | 49.5 | 50.4 | — | | |
| $H_2/CO$ ratio | 2.04 | 1.98 | — | | |

As shown in Table 6, it can be confirmed that the catalyst prepared in Preparation Example 1 had stable reaction activity without serious deactivation during a long reaction of 100 hours, and after the reaction, the amount of carbon precipitation was very low at within 0.2% by weight. Even in the combined reforming of methane and carbon dioxide at high temperature with steam as a reactant, the catalyst durability effect due to the $SiO_2$ coating layer can be confirmed.

Comparative Experimental Example 1: Synthesis Gas Preparation Through Combined Reforming Using Commercial Catalyst The results of measuring $CO_2$, $CH_4$ conversion and $H_2/CO$ molar ratio of FCR-4 (12 wt % $Ni/Al_2O_3$), a commercial catalyst of Clariant, are shown in Table 7 below.

TABLE 7

| Classification | FCR-4 | | Average deactivation rate (%/h) |
| --- | --- | --- | --- |
|  | Beginning | 20 hours later |  |
| $CH_4$ conversion rate (%) | 90.1 | 85.0 | −0.94 |
| $CO_2$ conversion rate (%) | 47.3 | 44.3 | −0.06 |
| $H_2/CO$ ratio | 2.3 | 2.3 | — |

As shown in Table 7, it can be seen that in the case of the commercial catalyst, the average deactivation rate for 20 hours was higher than that of the catalyst prepared in the Preparation Examples.

Comparative Experimental Example 2: Comparative Synthesis Gas Preparation Experiment According to Catalyst Type Comparative Preparation Example 4

2 g of the triblock copolymer P123 (EO20PO70EO20, Aldrich) was dissolved in 15 g of deionized water and 60 g of a 2 M $HNO_3$ solution at room temperature. The required amount of magnesium acetate ($Mg(CH_3COO)_2$) was added to the solution with stirring. After 0.5 hours, 4.25 g of tetraethylorthosilicate (TEOS, 98%, Aldrich) was added dropwise under stirring condition to the mixture maintained at a temperature of 40° C. for 24 hours. The resulting suspension was aged at a temperature of 100° C. for 24 hours under static conditions, and then the liquid was evaporated while stirring at a temperature of 80° C. The solid was dried at a temperature of 80° C. and fired at a temperature of 550° C. for 6 hours to remove the mold and form MgO.

The obtained MgO-SBA-15 powder was mixed with a $Ni(NO_3)_2 \cdot 6H_2O$ solution at a temperature of 80° C. under magnetic stirring, and 10 wt % of Ni was supported. After stirring, the solution is dried and then calcinated in air at a temperature of 550° C. for 6 hours.

Comparative Preparation Example 5

The nickel nanoparticle dispersion and the silica nanoparticle dispersion containing thiol groups were mixed and treated with an ultrasonic generator for 1 hour, centrifuged, and then the supernatant was removed, dried in an oven at a temperature of 80° C. for 12 hours, and a nickel-supported catalyst ($Ni/SiO_2$) is prepared.

Next, 100 mg of the nickel-supported catalyst, 100 mg of CTAB (Cetyltrimethylammonium bromide), 10 ml of ethanol, 0.2 ml of ammonia water, and 0.5 ml of TEOS were mixed and stirred for 4.5 hours, centrifuged to remove the supernatant, and dried in an oven at a temperature of 80° C. for 12 hours.

After drying, heat treatment was performed at a temperature of 550° C. for 2 hours using an electric furnace in an air atmosphere, and a nickel-supported catalyst ($Ni/SiO_2@SiO_2$) coated with silica was obtained.

Using the catalysts prepared in Preparation Example 1, Comparative Preparation Example 4, and Comparative Preparation Example 5, synthesis gas was prepared under the conditions summarized in Table 8 below, and the results are also shown in Table 8 below.

The catalyst prepared in Comparative Preparation Example 4 was that SBA-15 was coated with MgO and then Ni was supported, and the catalyst prepared in Preparation Example 1 was different in that $SiO_2$ was coated with Ni nanoparticles. That is, since the catalyst prepared in Comparative Preparation Example 4 was not coated with Ni, it was difficult to expect hydrothermal stability when applied to combined reforming including steam ($H_2O$) in the reaction gas. In addition, since the catalyst prepared in Comparative Production Example 4 was a catalyst in which Ni was simply supported, Ni may be easily sintered during long-term durability evaluation.

The catalyst prepared in Comparative Preparation Example 5 uses a $SiO_2$ support, and unlike SBA-15, the $SiO_2$ support had very poor hydrothermal stability, and thus severe deactivation was expected in combined reforming involving steam. In addition, $SiO_2$ must be included in a limited amount in the combined reforming so that the catalyst structure does not collapse. Using $SiO_2$ in a coating amount as in Preparation Example 1 did not cause a big problem, but when $SiO_2$ was used as a support as in Comparative Preparation Example 5, there was a high possibility that Ni was sintered, and serious deactivation was expected. In addition, since $SiO_2$ and SBA-15 had a large difference in specific surface area ($SiO_2$: 60.4 $m^2/g$, SBA-15: 647 $m^2/g$), the amount of Ni that was carried on the support was also very limited in the case of a $SiO_2$ support.

Therefore, the catalysts prepared in Comparative Preparation Example 4 and Comparative Preparation Example 5 were applied to the preparation of synthesis gas through dry reforming. The reaction gas of dry reforming was $CH_4$:$CO_2$=1:1, and the reaction gas of combined reforming was $CH_4$:$CO_2$:$H_2O$=1:0.4:0.8, so the supply gas conditions were very different.

In general, it is impossible to compare the catalytic activity between these two reactions. However, according to the various exemplary embodiments and using thermodynamic calculation of the equilibrium conversion rate (theoretical maximum conversion rate) in each reaction condition using the HSC-chemistry program, as shown in Table 8, it can be seen that the catalyst prepared in Preparation Example 1 had superior catalytic activity compared to the catalysts prepared in Comparative Preparation Example 4 and Comparative Preparation Example 5.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for preparing a synthesis gas, comprising, injecting a reaction gas comprising water ($H_2O$) and heat-treating in the presence of a catalyst,

TABLE 8

| | T (° C.) | P (bar) | Space velocity GHSV (mL/$g_{cat}$/h)[1] | $CH_4$ | $CO_2$ | $H_2O$ | $CH_4$ conv. (%) Compared to the equilibrium Conversion rate | $CO_2$ conv. (%) Compared to the equilibrium Conversion rate | $H_2$/CO (Molar ratio) | Long-term durability (h) | Deactivation rate (%) | Ni nanoparticle average size (nm) |
|---|---|---|---|---|---|---|---|---|---|---|---|---|
| Preparation Example 1 | 800 | 1 | 60,000 | 1 | 0.4 | 0.8 | 96.6 / 96.8 | 49.5 / 90.0 | 1.98-2.04 | 100 | 0.03 | 4 |
| Comparative Preparation Example 4 | | | 36,000 | 1 | 1 | — | 92 / 98.6 | 85 / 88.1 | 0.8-1.15 | 40 | 9.46 | 10.8 |
| Comparative Preparation Example 5 | | | 12,000 | 1 | 1 | — | 33 / 35.4 | 51 / 52.8 | 0.63-0.68 | 200 | 15.15 | 5 |

[1] The greater the space velocity (GHSV), the more severe the condition.

wherein the catalyst comprises:
a mesoporous support,
metal nanoparticles supported on the support, and
a metal oxide coating layer coated on a surface of the support,
wherein the mesoporous support comprises regularly distributed mesopores, and
wherein the metal oxide coating layer comprises $SiO_2$.

2. The method of claim 1 wherein a combined reforming reaction is performed and comprises the injecting of the reaction gas.

3. The method of claim 1, wherein the reaction gas comprises the water, and one or more selected from the group consisting of a C1 to C20 alkane, a C1 to C20 alkene, a C1 to C20 alkyne, carbon dioxide, ammonia, $HCO_2H$, and $CH_3OH$.

4. The method of claim 1, wherein the reaction gas comprises methane, and an oxidizing agent comprising carbon dioxide and the water, and the synthesis gas comprises hydrogen and carbon monoxide.

5. The method of claim 1, wherein the reaction gas comprises the methane and the oxidizing agent in a molar ratio of about 1:1 to 1:1.9.

6. The method of claim 1, wherein the oxidizing agent comprises the carbon dioxide and the water in a molar ratio of about 1:0.2 to 0.4:0.8.

7. The method of claim 1, wherein the heat-treating is performed at a temperature of about 650° C. to 850° C.

8. The method of claim 1, wherein the support comprises one or more selected from the group consisting of poly (ethylene oxide)-poly(propylene oxide)-poly(ethylene oxide) (pluronic P123), polyethylene oxide (PEO), polypropylene oxide (PPO), $SiO_2$, $Al_2O_3$, MgO, $MgAl_2O_4$, $La_2O_3$, $CeO_2$, $ZrO_2$, SiC, an indium tin oxide (ITO), and a fluorine doped tin oxide (FTO).

9. The method of claim 1, wherein the support comprises one or more selected from the group consisting of MCM-41, MCM-48, SBA-1, SBA-15, SBA-16, KIT-1, KIT-6, MSU-1, HMS, AMS-8, AMS-10, FDU-1, FDU-2, and FDU-12.

10. The method of claim 1, wherein the metal nanoparticles comprise one or more selected from the group consisting of Ni, Fe, Cu, Co, Mo, Ru, Rh, Pd, Ag, Cd, Zn, Au, Pt, Ir, Os, W, and an oxide thereof.

11. The method of claim 1, wherein a diameter of the metal nanoparticles is about 10 nm or less.

12. The method of claim 1, wherein the metal nanoparticles are included at about 5 parts by weight to about 15 parts by weight based on 100 parts by weight of the support.

13. The method of claim 1, wherein the metal oxide coating layer comprises the mesopores having a diameter of about 2 nm to 50 nm.

14. The method of claim 1, wherein the metal oxide coating layer is included at about 5 parts by weight to about 15 parts by weight based on 100 parts by weight of the support.

* * * * *